J. W. KEENE.
Cut-Off Mechanisms for Magazine Fire-Arms.
No. 147,948. Patented Feb. 24, 1874.
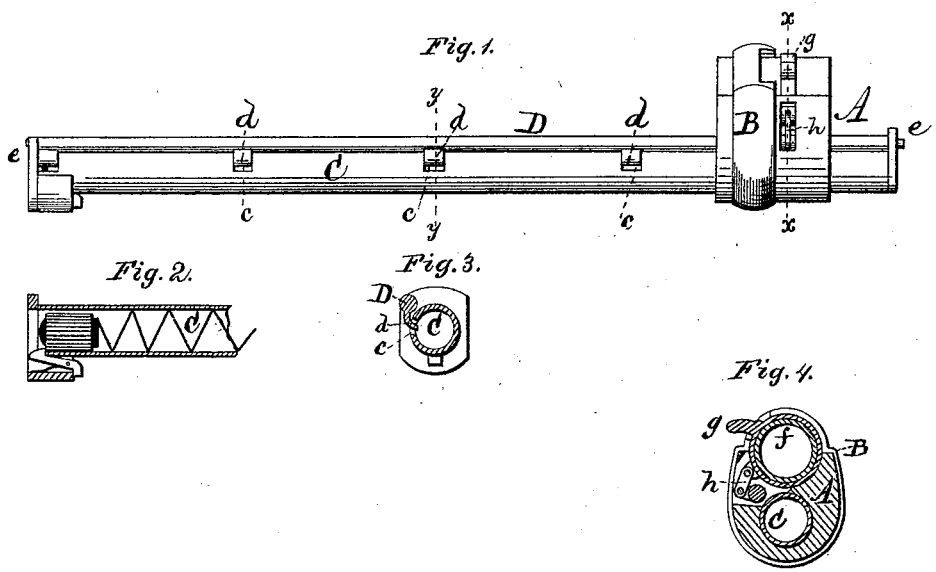

UNITED STATES PATENT OFFICE.

JOHN W. KEENE, OF NEWARK, NEW JERSEY.

IMPROVEMENT IN CUT-OFF MECHANISMS FOR MAGAZINE FIRE-ARMS.

Specification forming part of Letters Patent No. 147,948, dated February 24, 1874; application filed December 17, 1873.

*To all whom it may concern:*

Be it known that I, JOHN W. KEENE, of Newark, in the county of Essex and State of New Jersey, have invented a new and useful Cut-Off Rod for Magazine-Guns; and I do hereby declare that the following is a full, clear, and exact description thereof, sufficient to enable those skilled in the art to which my invention appertains to make and use the same, reference being had to the accompanying drawing, in which—

Figure 1 is a side view of my invention. Fig. 2 is a longitudinal section. Fig. 3 is a transverse section taken in line $y\ y$ of Fig. 1. Fig. 4 is a transverse section taken in line $x\ x$ of Fig. 1.

My invention relates to an attachment to a magazine-gun, for the purpose of preventing the cartridges in the tube from moving longitudinally, so as to strike the point of one cartridge against the head of another, and render them liable to explode. My invention consists in a rod running parallel with the magazine-tube, and having its ends journaled in lugs near the ends of the tube, said rod being provided with claws projecting from it at suitable intervals and extending into openings in the tube, so as to engage with each cartridge separately and prevent it from moving, said rod being also provided with a thumb-piece, connected to it by links, for the purpose of throwing the claws in and out of engagement with the cartridges.

In the drawing, A represents a portion of the stock of a magazine-gun, surrounded by a band, B. C represents a magazine-tube, lying under and parallel with the barrel of the gun. D is a rod, having its ends journaled in lugs $e\ e$, near the ends of the tube, so as to allow a reciprocating rotary motion to the rod. At a point near the lower band is a ring, surrounding the barrel $f$ of the gun, (see Fig. 4,) and provided with a thumb-piece, $g$, for turning it. A lug projects from the ring near the thumb-piece, and another lug projects from the rod D; and these two lugs are connected by a link, $h$, having its ends pivoted to said lugs, so that, by turning the thumb-piece back and forth, the rod is turned in a corresponding direction.

If desired, the rod D may be furnished with a pinion or a toothed segment, operated by a corresponding rack on the ring, or otherwise, attached to the thumb-piece $g$.

The rod D has claws $d$ projecting from one side at suitable intervals, and extending into openings $c$ in the tube C at points corresponding with the location of the claws.

When the thumb-piece $g$ is turned down, the claws $d$ are extended into the openings $c$, each claw bearing against a cartridge at or near its flange, and clamping it in place sufficiently close to prevent it from moving in the tube. By this means the cartridges are prevented from jolting together, and danger of explosion from such cause is entirely obviated.

What I claim as new, and desire to secure by Letters Patent, is—

The cut-off rod D formed with claws $d$, for clamping the cartridges in the magazine, and provided with suitable means for operating the same, substantially as shown and described.

J. W. KEENE.

Witnesses:
A. T. SANGSTON,
E. R. BROWN.